UNITED STATES PATENT OFFICE.

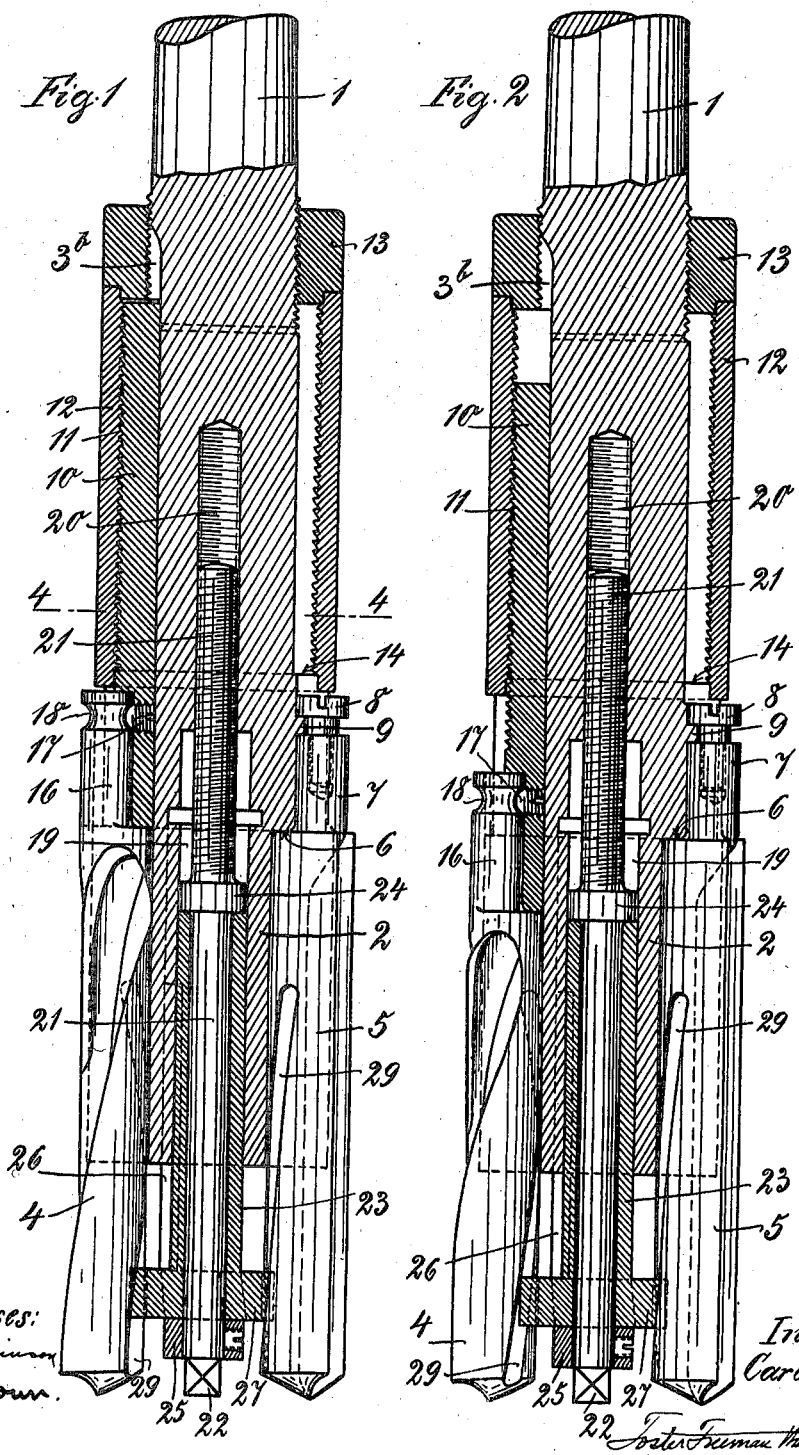

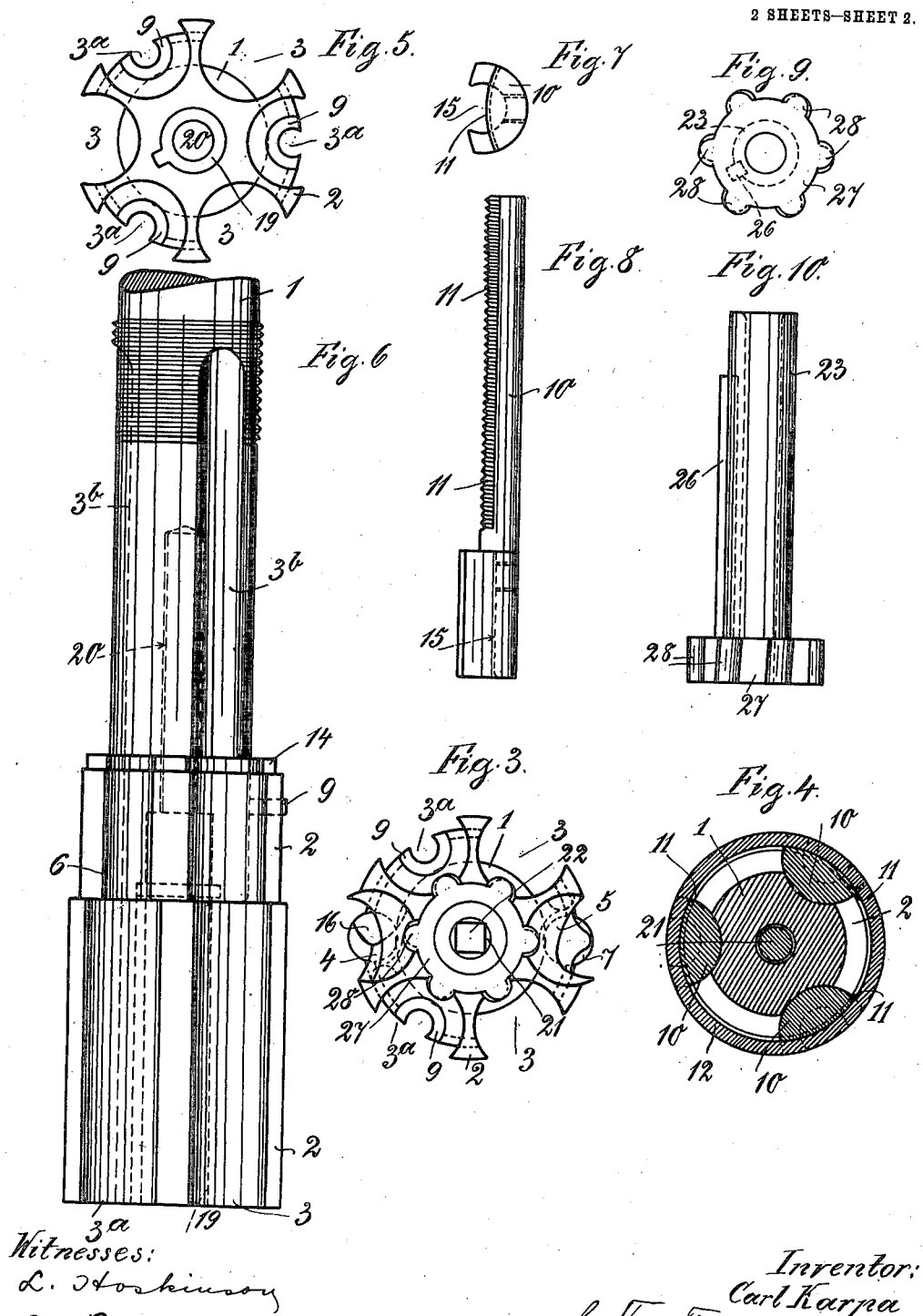

CARL KARPA, OF BERLIN, GERMANY, ASSIGNOR TO STAHLWERK BECKER AKTIEN-GESELLSCHAFT, OF WILLICH, GERMANY.

COMBINED BORING AND REAMING TOOL.

1,032,682.  Specification of Letters Patent.  Patented July 16, 1912.

Application filed October 2, 1911. Serial No. 652,340.

*To all whom it may concern:*

Be it known that I, CARL KARPA, a subject of the King of Prussia, and resident of 34 Waldstrasse, Berlin, Kingdom of Prussia, German Empire, have invented a new and Improved Combined Boring and Reaming Tool, of which the following is a specification.

This invention relates to an improved combined boring and reaming tool of the type in which boring bits and reamers are arranged so as to be axially movable in grooves in a boring head and adapted to be turned about their axes as required by the movement of an adjusting bolt or the like.

The object of the present invention is to provide means for axially adjusting the boring bits independently of the reamers in order that the boring bits may be adjusted in proper position relatively to the reamers on the grinding down of the point of the boring bit.

According to the present invention the boring bit is carried by a slide piece which is longitudinally movable in a longitudinal groove in the boring head, the slide piece being externally threaded to receive a sleeve nut which is secured against longitudinal movement.

In order that the invention may be more readily understood, reference is made to the accompanying drawings which show by way of example the preferred method of carrying out the invention.

Figure 1 is a central vertical section through the combined boring and reaming tool, Fig. 2 is a view similar to Fig. 1 showing the position the parts assume after the point of the boring bit has been ground down and adjusted in consequence thereof. Fig. 3 is an inverted plan view of the tool but showing only one boring bit and one reamer in position, the others being removed for the sake of clearness. Fig. 4 is a transverse section on the line 4—4 of Fig. 1. Fig. 5 is an inverted plan view, and Fig. 6 a side view of the boring head with the boring bits and reamers removed. Fig. 7 is a plan view, and Fig. 8 a side view of the slide pieces carrying the boring bits, Fig. 9 is an inverted plan view and Fig. 10 a side view of the sleeve for turning the boring bits and reamers about their axes.

On the drawings 1 designates a rotatable shaft integral with which is a boring head 2 provided with longitudinal grooves 3 and 3ª respectively, three of each of such grooves being shown on the drawings. The grooves 3 in the boring head 2 are adapted to receive the boring bits 4 and the rotatable shaft 1 is provided with grooves 3ᵇ in alinement with the grooves 3. The grooves 3ª are adapted to receive the reamers 5 said grooves terminating in a shoulder 6 against which is adapted to abut the shoulder on the reamer 5, which is provided with a reduced shank portion 7 and is held in position in the groove 3ª by means of a screwed pin 8 screwed into the shank 7 of the reamer 5, a slotted projection 9 on the boring head 2 being adapted to be clamped between the head of the screwed pin 8 and the shank 7 of the reamer, while allowing of turning movement of the reamer 5.

The boring bits 4 are each carried by a slide piece 10 shown in detail in Figs. 7 and 8, said slide piece 10 being correspondingly shaped to fit within the groove 3ᵇ of the boring shaft 1 and being externally threaded at 11 to receive an exteriorly roughened sleeve nut 12 which is prevented from longitudinal movement on the one hand by means of a nut 13 screwed on the shaft 1 and on the other side engaging a shoulder 14 on the boring head 2. The lower end of the slide piece 10 is slotted at 15 to receive the shank 16 of the boring bit which is rotatably held therein by means of a grub screw 17 engaging an annular recess 18 in the shank 16. It will thus be seen that on rotating the sleeve nut 12 in one direction or the other the slide pieces 10 will be raised or lowered and thus raise or lower the boring bits 4 as required independently of the reamers 5, so that when the boring bit 4 is ground down at the point it may be adjusted into the required position.

In order to give a slight turning movement to the boring bits 4 and reamers 5 in order to adjust the same to the size of hole to be bored, the boring head 2 is provided with a central bore 19 terminating in a threaded part 20 in which is adapted to be screwed the screwed end of a bolt 21, the outer end 22 of which is squared to receive a screw key. Loosely mounted on the bolt 21 is a sleeve 23 prevented from longitudinal movement thereon by means of a collar 24 on the bolt 21 and a collar 25 pinned thereto. The sleeve 23 is also prevented from rotation by means of a key 26 engaging a corresponding key way in the boring head 2.

As clearly shown in Figs. 9 and 10 the sleeve 23 is provided with an enlarged head 27 having inclined or slightly spirally formed projections 28, which are adapted to engage in grooves 29 cut in the back of the boring bits 4 and reamers 5. It will thus be readily seen that on rotating the bolt 21 the sleeve 23 and head 27 will move either upwardly or downwardly, and, being prevented from rotation, its projections 28 engaging the grooves 29 will cause the boring bits 4 and reamers 5 to be correspondingly rotated about their axes.

The tool is employed in the following manner:—The parts being mounted in position as illustrated in Fig. 1 and as hereinbefore described, the tool is then in readiness for simultaneous boring and reaming. If the bore hole is to be enlarged, the bolt 21 is rotated by fitting a screw key on the squared end 22 thereof. By screwing the bolt 21 into the boring head, the non-rotatable sleeve 23 is forced inwardly and consequently its projections 28 move up the grooves 29 in the boring bits 4 and reamers 5 and cause the latter to rotate about their axes by which means the cutting edges are caused to project slightly farther from the center of the tool. When the cutting edges of the boring bits become blunt, the latter may be removed and reground. This grinding operation, however, shortens the length of the bit and, therefore, in order that the points of the boring bits and reamers may be brought into the same plane transversely to the boring head, it is necessary, on reinserting the boring bits, to rotate the sleeve nut 10 and cause the slide-pieces 10 to move downwardly until the points of the bits and reamers are in the same plane, this position being illustrated in Fig. 2. The tool is then again in readiness for the boring and reaming operation and may be adjusted to the size of hole to be bored by corresponding adjustment of the sleeve 23 in the manner already described.

It will of course be readily understood that the foregoing construction is illustrated only by way of example and that the adjustment of the boring bits 4 independently of the reamers 5 and the means for turning the same about their axes may be readily accomplished in other ways without departing from the scope of the appended claims.

I claim:—

1. A combined boring and reaming tool comprising, in combination, a rotatable boring head, boring bits and reamers carried by said head and capable of being turned about their axes, and means for axially adjusting the boring bits relatively to the reamers.

2. A combined boring and reaming tool, comprising, in combination, a rotatable boring head having longitudinal grooves therein, boring bits and reamers carried in said grooves in said head and capable of being turned about their axes, slide pieces slidable in said longitudinal grooves and carrying said boring bits, and means for sliding said slide pieces in said longitudinal grooves so as to axially adjust the boring bits relatively to the reamers.

3. A combined boring and reaming tool, comprising, in combination, a rotatable boring head having longitudinal grooves therein, boring bits and reamers carried in said grooves in said head and capable of being turned about their axes, slide pieces slidable in said longitudinal grooves and carrying said boring bits, said slide pieces being externally threaded, and a sleeve nut threaded on said slide pieces and prevented from axial movement whereby, on rotating said sleeve nut, said boring bits are adjusted relatively to the reamers.

4. A combined boring and reaming tool comprising, in combination, a rotatable boring head, boring bits and reamers carried by said head and having spiral grooves cut in the back thereof, projections engaging said spiral grooves, means for longitudinally moving said projections so as to turn said boring bits and reamers about their axes, and means for axially adjusting the boring bits relatively to the reamers.

5. A combined boring and reaming tool, comprising, in combination, a rotatable boring head having longitudinal grooves therein, boring bits and reamers carried in said grooves in said head and having spiral grooves cut in the back thereof, projections engaging said spiral grooves, means for longitudinally moving said projections so as to turn said boring bits and reamers about their axes, slide pieces slidable in said longitudinal grooves and carrying said boring bits and means for sliding said slide pieces in said longitudinal grooves so as to axially adjust the boring bits relatively to the reamers.

6. A combined boring and reaming tool, comprising, in combination, a rotatable boring head having longitudinal grooves therein, boring bits and reamers carried in said grooves in said head and having spiral grooves cut in the back thereof, projections engaging said spiral grooves, means for longitudinally moving said projections so as to turn said boring bits and reamers about their axes, slide pieces slidable in said longitudinal grooves and carrying said boring bits, said slide pieces being externally threaded, and a sleeve nut threaded on said slide pieces and prevented from axial movement whereby, on rotating said sleeve nut, said boring bits are adjusted relatively to the reamers.

7. A combined boring and reaming tool comprising, in combination, a rotatable boring head having a central bore terminating in a threaded part, boring bits and reamers carried by said head and having spiral grooves cut in the back thereof, a bolt fitted in said central bore and screwed into said threaded part, a sleeve loosely surrounding said bolt and secured against longitudinal and turning movements, projections on said sleeve engaging said spiral grooves, whereby said boring bits and reamers are turned about their axes on adjusting said bolt in the central bore, and means for axially adjusting the boring bits relatively to the reamers.

8. A combined boring and reaming tool comprising, in combination, a rotatable boring head having longitudinal grooves and a central bore terminating in a threaded part, boring bits and reamers carried in said grooves in said head and having spiral grooves cut in the back thereof, a bolt fitted in said central bore and screwed into said threaded part, a sleeve loosely surrounding said bolt and secured against longitudinal and turning movements, projections on said sleeve engaging said spiral grooves, whereby said boring bits and reamers are turned about their axes on adjusting said bolt in the central bore, slide pieces slidable in said longitudinal grooves and carrying said boring bits and means for sliding said slide pieces in said longitudinal grooves so as to axially adjust the boring bits relatively to the reamers.

9. A combined boring and reaming tool comprising, in combination, a rotatable boring head having longitudinal grooves and a central bore terminating in a threaded part, boring bits and reamers carried in said grooves in said head and having spiral grooves cut in the back thereof, a bolt fitted in said central bore and screwed into said threaded part, a sleeve loosely surrounding said bolt and secured against longitudinal and turning movements, projections on said sleeve engaging said spiral grooves, whereby said boring bits and reamers are turned about their axes on adjusting said bolt in the central bore, slide pieces slidable in said longitudinal grooves and carrying said boring bits, said slide pieces being externally threaded, and a sleeve nut threaded on said slide pieces and prevented from axial movement whereby, on rotating said sleeve nut, said boring bits are adjusted relatively to the reamers.

In witness whereof I have hereunto set my hand in the presence of two witnesses.

CARL KARPA.

Witnesses:
  HENRY HASPER,
  WOLDEMAR HAUPT.